Patented Sept. 28, 1937

2,094,368

UNITED STATES PATENT OFFICE 2,094,368

STABILIZED CARBON TETRACHLORIDE

Edmund C. Missbach, Oakland, Calif., assignor to Stauffer Chemical Company, a corporation of California No Drawing. Original application, January 23, 1935, Serial No. 3,181, which in turn is a division of Serial No. 692,819, October 9, 1933. Divided and this application May 14, 1937, Serial No. 142,626.

3 Claims. (Cl. 23—250)

This application is a division of my earlier application Serial Number 3,181 filed January 23, 1935, which, in turn, was a division of my earlier case Serial Number 692,819 filed October 9, 1933, now patent Number 2,043,257 of June 9, 1936.

This invention relates to the prevention of decomposition of halogenated hydrocarbon compounds, particularly chlorinated aliphatic hydrocarbons, and to the prevention of corrosion by these compounds. It is known that these materials when exposed to moisture, light, air, and heat, particularly during distillation, as in the case of carbon tetrachloride, decompose with the formation of substances of an objectionable character, usually acidic substances which render the material unsuitable for such purposes as extractions as well as corroding equipment. The decomposition I attribute to hydrolysis and liberating of acid or acid bodies which also catalyze the decomposition.

Examples of materials with which the present invention is concerned are carbon tetrachloride, $CCl_4$, chloroform, $CHCl_3$, trichlorethylene, $C_2HCl_3$, tetrachlorethylene, $C_2Cl_4$, pentachlorethylene, $C_2HCl_5$, and the like. Generally, it is concerned with chlorinated and brominated derivatives of methane, ethane, and higher paraffine, as well as ethylene and higher homologues thereof.

In my application Serial Number 3,181, I claimed the use of napthylamines as the stabilizing material for the halogenated hydrocarbon compounds. I have found that this material when used, for example, in chlorinated hydrocarbon compounds such as carbon tetrachloride, has a tendency under oxidizing conditions to impart a color. Since such compounds are often used for dry cleaning the imparting of color renders the material unsuitable. This difficulty I have been able to obviate by using diphenylamine present in the hydrocarbon in only a stabilizing amount, 1% or less, and even as little as 0.34% for example. I have successfully stabilized carbon tetrachloride with diphenylamine under the most searching conditions and without the undesirable color formation. Such a test has been reported in detail in my aforementioned patent.

I claim:

1. Carbon tetrachloride containing only a stabilizing amount of diphenylamine.
2. Carbon tetrachloride containing less than 1% of diphenylamine.
3. Carbon tetrachloride containing about 0.34% of diphenylamine.

EDMUND C. MISSBACH.